United States Patent
Herrmann et al.

(10) Patent No.: US 6,309,546 B1
(45) Date of Patent: Oct. 30, 2001

(54) MICRO AND ULTRAFILTERS WITH CONTROLLED PORE SIZES AND PORE SIZE DISTRIBUTION AND METHODS FOR MAKING

(75) Inventors: Robert C. Herrmann, Boulder; Steven M. Landin, Golden, both of CO (US)

(73) Assignee: Ellipsis Corporation, Boulder, CO (US)

(*) Notice: Subject to any disclaimer, the term of this patent is extended or adjusted under 35 U.S.C. 154(b) by 0 days.

(21) Appl. No.: 09/341,483

(22) PCT Filed: Jan. 6, 1998

(86) PCT No.: PCT/US98/00241

§ 371 Date: Jul. 8, 1999

§ 102(e) Date: Jul. 8, 1999

(87) PCT Pub. No.: WO98/30315

PCT Pub. Date: Jul. 16, 1998

Related U.S. Application Data (63) Continuation-in-part of application No. 08/782,540, filed on Jan. 10, 1997, now abandoned.

(51) Int. Cl.⁷ .................................................. B01D 39/00
(52) U.S. Cl. ............................ 210/500.25; 210/500.26; 210/490; 210/499; 427/244; 427/245; 264/45.1
(58) Field of Search .............................. 210/490, 500.25, 210/500.26, 499; 55/523, 524; 427/244, 245; 264/45.1

(56) References Cited

U.S. PATENT DOCUMENTS

| | | |
|---|---|---|
| 2,300,048 * | 10/1942 | Koehring . |
| 2,457,051 * | 12/1948 | Le clair . |
| 3,111,396 * | 11/1963 | Burton et al. . |
| 3,241,681 | 3/1966 | Pall . |
| 3,453,104 | 7/1969 | De Marchi et al. . |
| 3,471,028 | 10/1969 | Miller et al. ........................ 210/457 |
| 3,570,059 | 3/1971 | Mott . |
| 3,746,642 | 7/1973 | Bergstrom ............................ 210/446 |
| 3,751,271 | 8/1973 | Kimura et al. . |
| 3,788,486 | 1/1974 | Bergstrom ............................ 210/496 |
| 3,897,221 | 7/1975 | Salyer et al. . |
| 3,923,653 | 12/1975 | Lavins, Jr. . |
| 3,980,445 | 9/1976 | Aleshin et al. . |
| 4,014,680 | 3/1977 | Reen . |
| 4,069,157 | 1/1978 | Hoover et al. . |
| 4,082,834 | 4/1978 | Grossman et al. . |
| 4,301,012 | 11/1981 | Puckett . |
| 4,407,656 | 10/1983 | Hofer . |
| 4,407,657 | 10/1983 | Fransen . |
| 4,435,483 | 3/1984 | Ahslund et al. . |
| 4,552,719 | 11/1985 | Morimoto et al. . |
| 4,562,039 | 12/1985 | Koehler . |
| 4,613,369 | 9/1986 | Koehler . |
| 4,708,741 | 11/1987 | Amaya . |
| 4,717,455 | 1/1988 | Textor et al. . |
| 4,738,874 | 4/1988 | Berardo et al. ...................... 427/244 |
| 4,758,272 | 7/1988 | Pierotti et al. . |
| 4,762,619 | 8/1988 | Gaddis et al. ....................... 210/639 |
| 4,797,211 | 1/1989 | Ehrfeld et al. .................. 210/321.84 |
| 4,801,379 | 1/1989 | Ehrsam et al. ...................... 210/498 |
| 4,812,236 | 3/1989 | Ehrsam ............................... 210/490 |
| 4,826,642 | 5/1989 | Degen et al. . |
| 4,834,876 | 5/1989 | Walker . |

(List continued on next page.)

Primary Examiner—Ana Fortuna
(74) Attorney, Agent, or Firm—Steven C. Petersen; Hogan & Hartson, LLP (57) ABSTRACT

A micro/ultrafiltering element (10) and method for making a filter element are provided. The filtering element comprises a multi-level support (26) having a filtering membrane layer (12) formed thereon comprising sintered particles (14) of uniform diameter. The filtering membrane preferably has an average pore size of from about 0.005–10 micrometers. The filter element is capable of being formed in a variety of geometrical shapes based on the shape of the porous support,

36 Claims, 7 Drawing Sheets

U.S. PATENT DOCUMENTS

| | | | |
|---|---|---|---|
| 4,876,013 | 10/1989 | Shmidt et al. | 210/650 |
| 4,888,114 | 12/1989 | Gaddis et al. | 210/500.25 |
| 4,935,139 * | 6/1990 | Davidson et al. . | |
| 4,963,261 | 10/1990 | Witkowski et al. | 210/490 |
| 4,980,062 * | 12/1990 | Block | 210/490 |
| 5,114,447 | 5/1992 | Davis . | |
| 5,154,815 | 10/1992 | O'Neill . | |
| 5,158,586 | 10/1992 | Layton . | |
| 5,188,734 | 2/1993 | Zepf | 210/490 |
| 5,194,200 | 3/1993 | Anderson et al. . | |
| 5,196,120 | 3/1993 | White . | |
| 5,198,112 | 3/1993 | Martin et al. | 210/490 |
| 5,208,190 | 5/1993 | Anderson et al. . | |
| 5,215,724 | 6/1993 | Haerle . | |
| 5,238,477 | 8/1993 | Layton . | |
| 5,238,613 | 8/1993 | Anderson . | |
| 5,250,184 | 10/1993 | Maier | 210/653 |
| 5,262,198 | 11/1993 | Wu et al. . | |
| 5,262,199 | 11/1993 | Desu et al. . | |
| 5,277,819 | 1/1994 | Abrams | 210/636 |
| 5,279,737 * | 1/1994 | Sekhar et al. | 210/490 |
| 5,308,533 | 5/1994 | Hotaling et al. . | |
| 5,332,597 | 7/1994 | Carolan et al. | 427/243 |
| 5,364,586 | 11/1994 | Trusov et al. . | |
| 5,378,426 | 1/1995 | Geibel et al. . | |
| 5,387,339 | 2/1995 | Lee et al. . | |
| 5,405,529 * | 4/1995 | Shimai et al. | 210/496 |
| 5,456,740 | 10/1995 | Snow et al. | 96/11 |
| 5,487,771 | 1/1996 | Zeller | 55/523 |
| 5,589,081 * | 12/1996 | Harris | 210/484 |

* cited by examiner

MICRO AND ULTRAFILTERS WITH CONTROLLED PORE SIZES AND PORE SIZE DISTRIBUTION AND METHODS FOR MAKING

CROSS-REFERENCE TO RELATED PATENT APPLICATIONS

This patent application references Disclosure Documents entitled "Fiat and Tubular Micro- and Ultrafilters with Controlled Absolute Pore Sizes and Pore Size Distribution and Methods of Production." No.: 401103, filed Jun. 3, 1996 and "Proprietary Porous Metallic and Ceramic Membranes for Filtration and Aeration Applications," No.: 368975, filed Jan. 20, 1995.

This application is a Section 371 filing of PCT/WO98/30315, which is a Continuation-in-Part of U.S. patent application Ser. No. 08/782,540, filed Jan. 10, 1997, now abandoned.

TECHNICAL FIELD

The present invention relates to filtration technology and, more specifically to highly permeable micro- and ultrafilters having consistent uniform pore size and pore size distribution and methods for making them.

BACKGROUND ART

Filtration systems play an important role in a wide variety of industrial and commercial processes which generally increase our quality of life. High efficiency filtration systems are currently being used in numerous medical applications, including but not limited to blood filtration and the separation of microorganisms such as, bacteria and viruses from biological or other fluids (both liquids and gases). In this regard, filtration technology is also beneficial in the drug, cosmetic and beverage industries. Filters are also used to a great extent in the semiconductor and microelectronics manufacturing industry for fine clarification and for the special cleaning of liquids and gases. In addition to their role in separating materials, micro- and ultrafilters may also be used in catalytic processes to enhance chemical reactions taking place during the separation process or procedure.

A wide variety of materials having various geometries are used as filters according to existing techniques. As one may well imagine filters very broadly in composition, shape, and size with each parameter dependent upon the intended application. While filters may be manufactured front it host of materials, plastics, ceramics and metals, each having separate advantages and disadvantages, are most often used. Regardless of the material comprising the filter element, the major attributes desirable for filter elements are: (i) uniformity in pore size and pore size distribution especially in small dimensions. (ii) low pressure drop for flow of fluids, (iii) flexibility and mechanical strength to avoid collapse or tearing, and (iv) low rate of fowling and ease of cleaning. In addition some separation applications require the filter to perform in a high temperature environment or in a corrosive or "hostile" environment; consequently, the ability of the filter element to resist abrasion or shedding of particles can also bean important attribute. In this regard, metal filters are ideal candidates.

Metal filters, typically formed from wire mesh screen, have long been used for a variety of applications where relatively fine filtration capability must be combined with mechanical strength. flexibility, resistance to high temperatures and/or resistance to chemical attack. While this type of filter has many desirable characteristics, it suffers from low efficiency, for the removal of fine particles due to relatively large pore sizes of the wire mesh structure In an effort to create filters having uniform pore sizes in the range of 10 micrometers to 0.01 micrometers or less, attempts, met with limited success, have been made to alter the underlying size of the pores in a porous substrate by the application of a second and possibly subsequent layer(s) of material.

For example. Gaddis, et al., in U.S. Pat. No. 4,888,184, discloses a process for forming a filter having a metallic base. Metal oxide particles (e.g. $TiO_2$) having a size of from 0.2 to 1.0 micrometer are drawn into a porous metal substrate, such as, stain less steel, having a pore size of from about 0.5 micrometers to about 10 micrometers and the excess metal oxide particles are then removed from the surface of the substrate. The metal oxide particles within the metal substrate are then sintered to form a filter element.

U.S. Pat. No. 4,613,369 by Koehler discloses a method for making a porous filter. A stabilized suspension of dispersed metal particles is applied to a porous metal support, such as a wire mesh screen, to infiltrate the openings in the porous metal support. Excess particles are removed from the surface of the support with a doctor blade. The support is then heated to dry the stabilization suspension of metal particles and is compressed between rollers to decrease the pore size and improve the sintering characteristics. The support is then sintered to fuse the individual metal particles to the metal support and to each other.

U.S. Pat. No. 5,364,585 by Trusov, et al., discloses a method for making a porous composite membrane. Metallic particles having a particle size of less than about 50 $\mu$m are dispersed on a metallic substrate to form a sublayer wherein substantially no metallic particles are in contact with adjacent metallic particles. Subsequent to pre-sintering this sublayer, ultra-fine ceramic particles having an average particle size of less than about 200 nm are deposited on the substrate and plastically deformed by passing the substrate though a rolling mill and sintering the deformed particles to form a composite membrane.

The disadvantages associated with the techniques described above involve the plugging of the existing pores in the porous substrates by means of pressing powders into the openings and thereafter heating or annealing such powders to simply fill the pores to reduce their dimension. Due to the loose attachment of the deposited material and the tortuous flow paths created these fillers cause a high pressure drop across the filter, since pressure drop through the filter is a function of pore size, number of pores, tortuosity of the flow path and length of the flow path. Furthermore, where a filter is intended to be reusable, as opposed to simply being disposed of after time, it is necessary to clean the filter element. Cleaning a filter element is often accomplished by backflowing or backflushing a fluid (liquid or gas) through the filter or running a fluid at high shear velocity along the surface so that the retenate is dislodged. Such attempts at cleaning the filters described above can destroy or remove significant portions of a weakly deposited membrane surface.

In addition to the disadvantages discussed above, it is often desirable to form filters in a variety of shapes in order to provide large Surface areas for filtration within a small package. Fluted and/or dimpled patterns are common patterns to increase surface area. Cylindrical shapes provide maximum strength capability where a high pressure drop is anticipated. Moreover, the geometry of construction can define the strength of the element. Thus, it is desirable that filter elements having different configurations be available. The deposition techniques disclosed by Gaddis, et al., Koehler and Trusov, et al., do not readily lend themselves to the construction of filter elements in a variety of geometric shapes. Due to the flow characteristics of the deposited layers, non-uniformity of deposition can occur such that portions of the filter element will be completely closed while other portions of the filter element remain relatively open so that substantial inconsistency in filtering capabilities resides over the surface area of the filter element.

There is still a need, therefore, for filter elements and methods for fabricating the same, which have high mechanical strength, uniformity in pore size and pore size distribution, the ability of being formed in a variety of geometric shapes, and which can resist harsh or hostile environments.

DISCLOSURES OF INVENTION

Accordingly, it is an object of this invention to provide a method for creating filter elements of uniform pore size.

An additional object of the present invention is to provide filter elements and a method for producing the same which have a high density of pores that exhibit short relatively linear flow paths.

A further object of the present invention is to provide a method for forming filter elements of a variety of geometrical shapes.

It is still a further object of the present invention to provide filter elements and a method for producing the same that have high permeability.

Additional objects, advantages and novel features of the invention shall be set forth in part in the description that follows, and in part will become apparent to those skilled in the art upon examination of the following specification or may be learned by the practice of the invention. The objects and advantages of the invention may be realized and attained by means of the instrumentalities, combinations, composition, and methods particularly pointed out in the appended claims.

To achieve the foregoing and other objects and in accordance with the purposes of the present invention, as embodied and broadly described therein the method of this invention comprises, coating the surface area of a uniformly porous support with spherical particles of uniform diameter, followed by a heating regiment which removes any binder material prior to sintering the spherical particles thus forming a contiguous membrane having high permeability uniform pore size, and uniform pore distribution.

BRIEF DESCRIPTION OF THE DRAWINGS

The accompanying drawings, which are incorporated in and form a part of the specification, illustrate the preferred embodiments of the present invention, and together with the description serve to explain the principles of the invention.

In the Drawings

Best Mode for Carrying out the Invention

Figure 1:
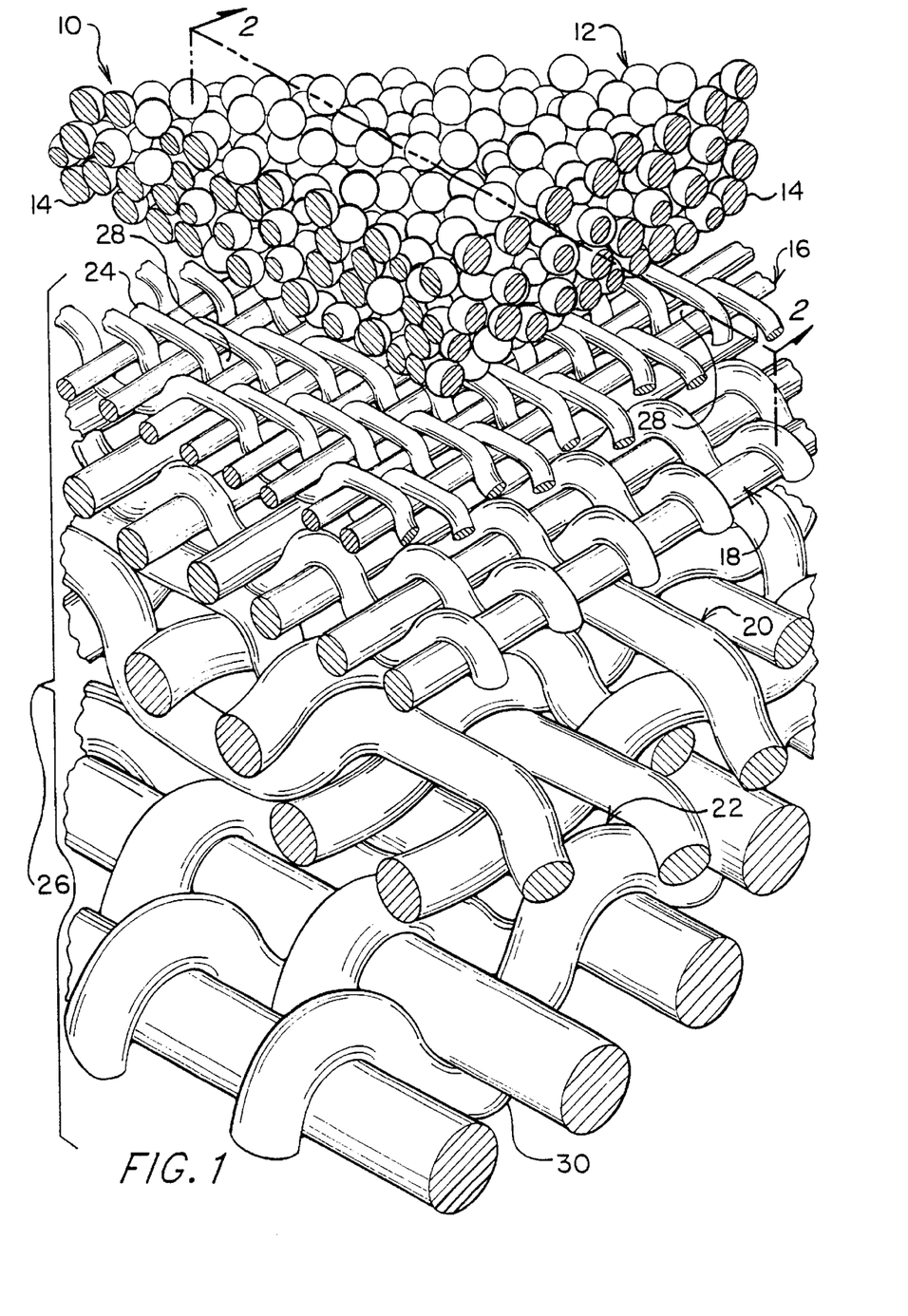
FIG. 1 is an exploded view of the filtering element made in accordance with the present invention.
Figure 2:
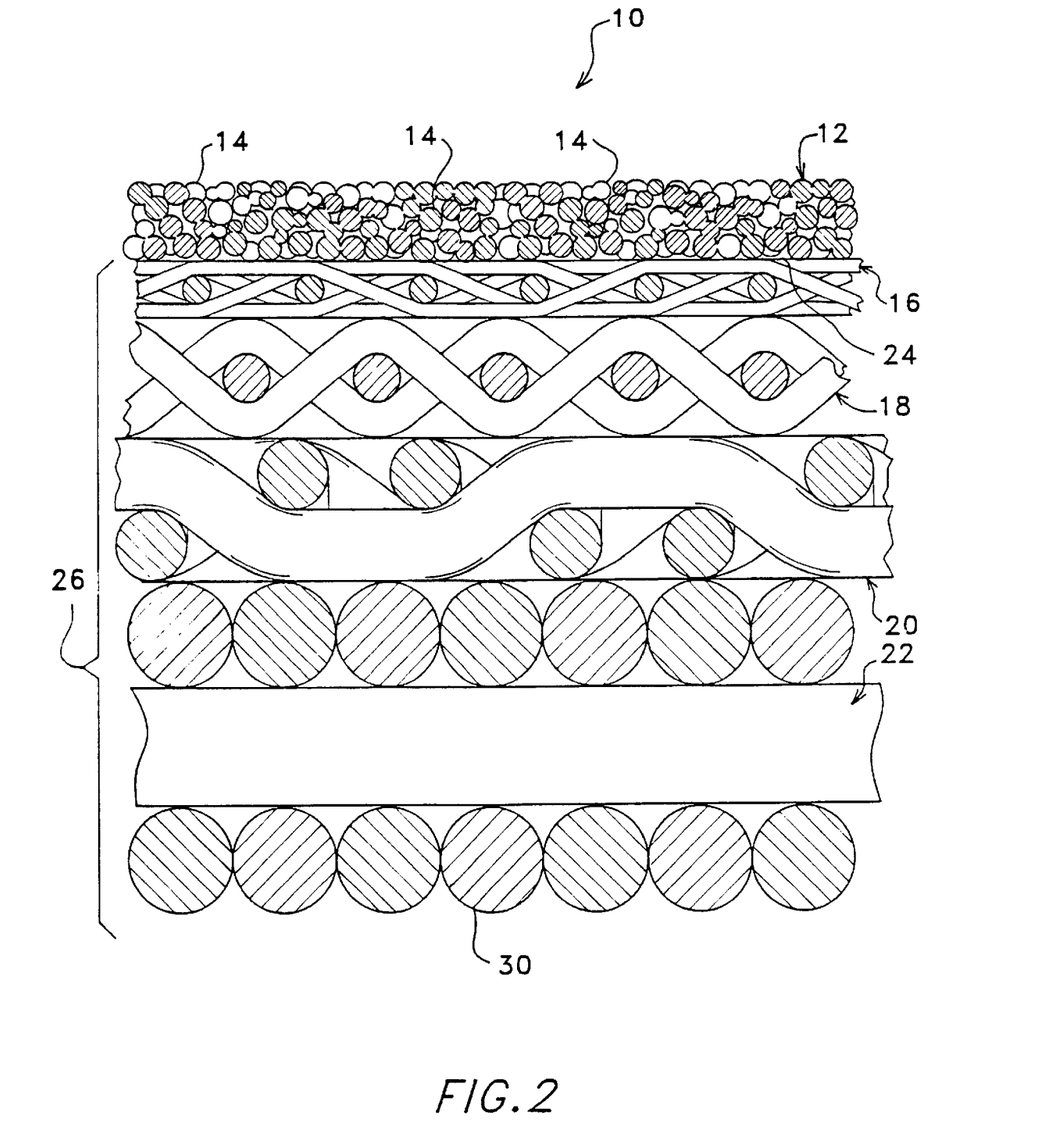
FIG. 2 is a cross-sectional view of the filtering element made in accordance with the present invention cut away along lines 2—2 of FIG. 1.
Figure 3:
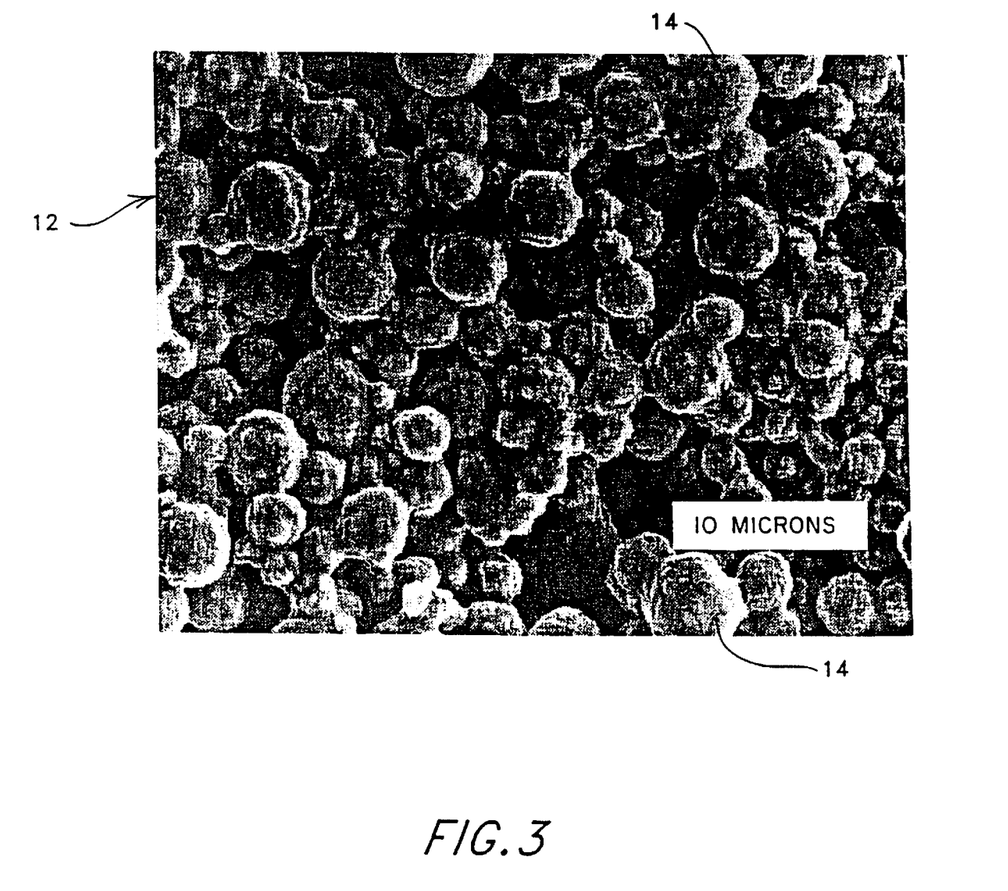
FIG. 3 is a photomicrograph (magnification 9.000 X) of the surface of a sintered stainless steel membrane element made in accordance with the present invention. A 10 $\mu$m scale is provided for purposes of illuminating the relative sizes of the metallic particles.
Figure 4:
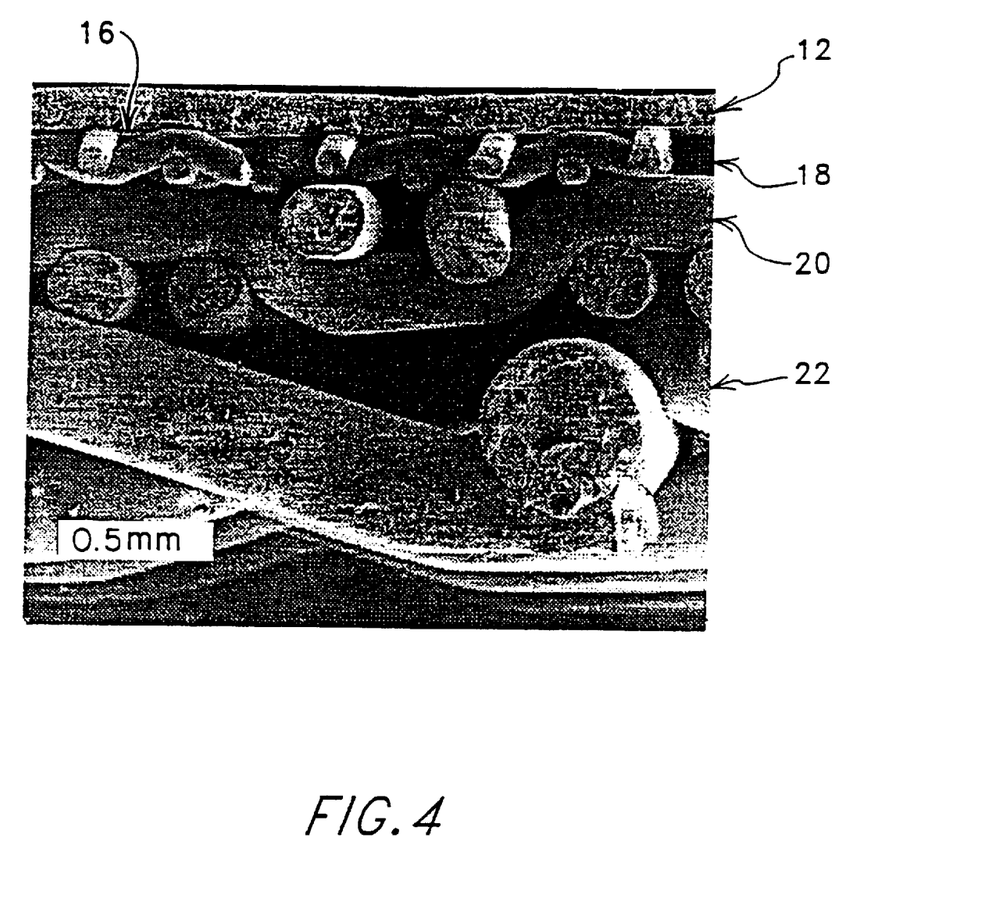
FIG. 4 is a fractured cross-sectional photomicrograph (magnification 50 X) of a sintered stainless steel membrane element made in accordance with the present invention using 10 micron size metallic particles. A 0.5 mm scale is provided for purposes of illuminating the relative sizes of the individual elements.

The filtering element 10, according to this invention, is represented in FIGS. 1 and 2, and essentially, comprises a membrane 12 comprised of contiguous particles 14 sintered to the surface 24 of a porous support 26. Prior to sintering, particles 14 having known maximum particle size diameter are mixed into a binder system to produce a suspension which is then deposited over the surface 24 of support 26 so that particles 14 are uniformly deposited thereon. Consequently, subsequent to sintering particles 14 are bound to one another and to surface 24 thereby forming membrane 12 having a consistently uniform pore size, pore size distribution and high permeability. Such a configuration not only allows high production rates with minimal pressure drop but also hinders plugging of pores 28, in the high-permeability support 26, with extraneous materials in the feed.

Membrane 12 and support 26 which comprise filtering element 10 of the present invention shown in FIGS. 1 and 2, can be made from any of a variety of metals, ceramics or a combination of the same. Examples of various metals and alloys contemplated by this invention include, but are not limited to, gold, silver, tin, platinum, nickel, chromium, copper, molybdenum, tungsten, zinc, aluminum, cobalt, iron, and magnesium, as well as combinations of metals and metal alloys, including boron-containing, alloys. Generally, high chromium concentration steel alloys are preferred for use herein. Of these the AISI designated stainless steels which contain iron, nickel, and chromium are most preferred. The particularly preferred stainless steels are the AISI 300 series, commonly referred to as the austenitic stainless steels, with 316L being especially preferred. A high corrosion resistance is desirable for the employment of filters in many applications and the preferred metals can advantageously provide good corrosion resistance, particularly in corrosive gaseous and liquid mediums.

Particles 14, are preferably 316L stainless steel and are preferably spherical or near-spherical, typically having diameter sizes in the range of 0.005 micrometers to 10 micrometers, and more preferably from about 1 to about 10. The size of the particle chosen is related to the application and the needed pore size; however regardless of the chosen particle size, 90% of the particles should be of the desired size and size distribution.

Support 26 serves as a base for the application of a suspension of dispersed particles 14 which ultimately form porous membrane 12, and thereby contributes to structural integrity, strength, and flexibility of be filtering device 10 according to the present invention. Wire mesh stainless steel screens are the preferred support: however, sintered metals, sintered ceramics sintered metal fiber meshes, sintered random metal fiber meshes, ceramic fiber meshes, electroformed screens, photoetched screens and plasma etched screens may also be used. Ideally, support 26 is a multistructured design having four layers 16, 18, 20, and 22 of progressively coarser mesh sizes bonded together, using techniques such as fusion bonding or sintering in all overlapping manner. Layer 16 which provides supporting surface 24 for membrane 12 comprises the finest mesh count of the four layers. In the preferred embodiment of the present invention, layer 16 is a Dutch Twilled Weave (DTW) having a nominal mesh count of 325×2300 (the numbers refer to the number of wires per inch in each direction), and a 2 $\mu$m nominal 8 $\mu$m absolute pore size. Other fine meshes in the range of 510×3,600 to 165×1,400 may also be used. Layer 18, juxtaposed to layer 16, protects layer 16 from possible deformation under high pressure. Ideally the weave is a Single Plain Dutch Weave, although other types of weave including twill, double twill, reverse weave and so on can also be used. The mesh size of layer 18 is dependent on the mesh size of layer 16. Layer 20, the third layer, is positioned horizontally below layer 18 making the wire cloth laminate stable and improves the welding characteristics. As with layer 18, the mesh size of layer 20 will depend on the mesh size utilized in layer 18. The final layer 22, functions as a second support layer (layer 20 being the first) and is usually positioned or oriented 90 degrees to layer 20 for additional rigidity. Layer 22 is preferably a Reverse Plain Dutch Weave utilizing wires having a larger diameter. The mesh size of layer 22 is again dependent on the mesh size of layer 20. While substrate 26 may be fabricated by positioning layers 16, 18, 20, and 22 horizontally above one another and then bonding be individual layers together thereby forming a single element, substrate 26 is also commercially available from Purolator Products Company, Facet Filter Products Division, Greensboro, N.C. as a modified version of Purolater™.

In the preferred embodiment according to the present invention the particles 14, which are preferably made from the same material used for a support 26, that is, 316L stainless steel, are applied to the porous metal support 26 in the form of a liquid suspension. In preparing the liquid suspension for use in accordance with the present invention the preferred range for the concentration of metal particles in the liquid suspension is from about 50 to about 75 percent per weight. In general, and as discussed in further detail in the Examples that follow, the suspension of metal particles 14 will be comprised of the following: 1) a solvent being either aqueous or nonaqueous (typical nonaqueous formulations will be combinations of trichlorethylene, methylethyl ketone, ethanol. Or toluene); 2) a binder or polymer such as polyvinyl butyral or acrylic; 3) a plasticizer such as polyethylene glycol: 4) dispersants which serve as adeflocculant for the suspension, and 5) metal particles 14.

Prior to depositing particles 14 onto support 26, support 26 is thoroughly cleaned to remove any greases, oils, or contaminants which detract from optimal adhesion by immersing support 26 in a series of acetone, methanol, and water washes preferably under ultrasonic conditions. Support 26 is then dried by flowing a gas stream (not shown) over the body of support 26, Support 26 is then appropriately masked and the suspension, of particles 14 is applied. Various techniques for applying the suspension of particles 14 to support 26 include dip coating, spin coating, spray coating, tapecasting, screen printing, and electrophoretic and thermophoretic techniques.

Preferably, the binder present in the suspension will allow particles 14 to adhere to one another and will allow the collective mass of particles 14 to adhere to the surface 24 of support 26. Thus, particles 14 do not, to an appreciable extent penetrate the pores 28 of support 26. In the event the particles 14 have a smaller diameter than pores 28, and are thus capable of penetrating pores 28, various techniques may be used to prevent further penetration. One solution is to provide all organic binder ill the pores 28 of support 26, either all through support 26 or alternatively only at the surface 24 to which the suspension is applied. The coated support 26 is then heated to volatize or burn off the organic binder and partly sinter the particles 14 of the coating membrane 12. Another solution involves applying a nonporous fugitive film (not shown) to the back surface 30 of support 26, prior to applying the solution of particles 14 to the front surface 24. Air trapped in pores 28 of support 26 prevents penetration of the solution. On heating, the fugitive layer is easily volatized or burned off back surface 30.

The freshly coated support 26 is then air dried at temperatures less than 100° C, for a period of time sufficient to allow for the evaporation of solvents present. The coated support is then heated at about 1° to 5° C., per minute in air or flowing (sweep) gas up, to 350°–450°C. for 10–40 minutes thereby removing the organic binders that are present. Particles 14 are then sintered together in a controlled manner for a period of time and temperature to achieve partial necking between the individual particles 14, leading to the formation of membrane 12 For stainless steel supports and particles, sintering takes place in a reducing atmosphere. i.e., 2–100% $H_2$, the balance being all inert gas or in a vacuum furnace at $10^{-5}$ torr or less, with or without a gettering agent such as a titanium sponge, at a temperature in the range of 900°–1200° C. for 10 minutes to 10 hours with a temperature of 1000° C. for 4 hours being preferred.

Filtering element 10, made according to the above description may have a pore size in the range of 0.005 $\mu$m to 10 $\mu$m and a specific permeability of 100 L/min×square meter×psig and 30 L/min square meter×psig for pore sizes of 2 $\mu$m and 1 $\mu$m, respectively. Furthermore, support 26 is malleable and may be formed into a variety of geometrical shapes prior to depositing the solution of particles 14.

Figure 5:
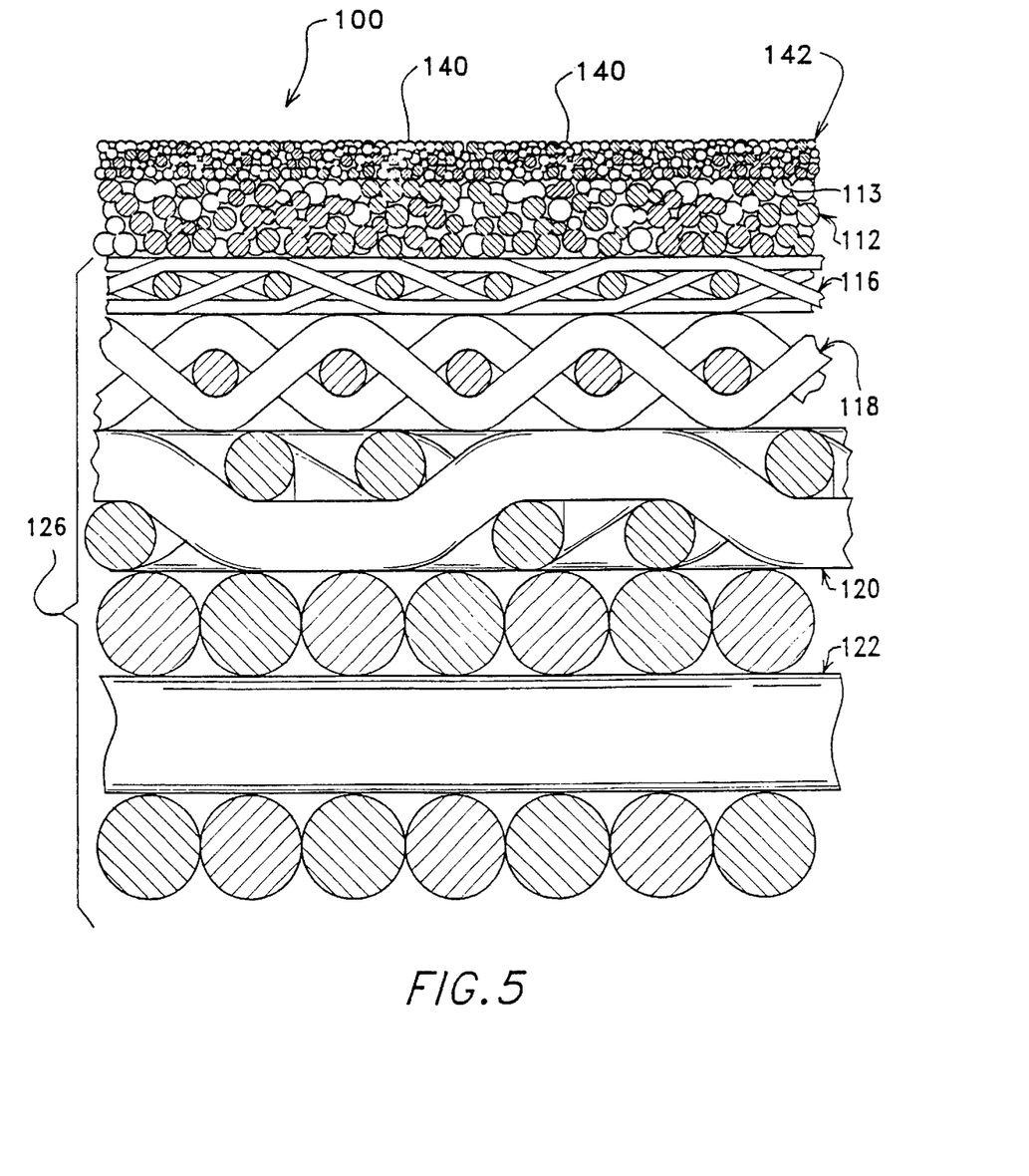
FIG. 5 is a cross-sectional view of an alternate embodiment of the filtering element of the present invention wherein the filter membrane is graded.

A second embodiment of the present invention teaches a method to further reduce the effective pore size of filter element 10, described previously, by applying additional mixtures of uniform spherical or near-spherical particles having a smaller maximum particle size distribution than the previously applied layer. Following the same procedures for fabricating the preferred embodiment of filter element 10, discussed previously, filter element 100, shown in FIG. 5 is achieved by depositing additional layers of smaller particles 140 over membrane 112 following the sintering step discussed previously, In the alternative, particles 140 maybe deposited over membrane 112 after membrane 112 has air dried. Once the desired pore size is achieved, filter element 100 is heated as discussed previously to remove the binder and to sinter membrane 142 to the surface 113 of membrane 112. This process may be repeated until the desired thickness or graded microstructure is achieved.

In a third embodiment, the effective pore size of filter element 10 of the present invention is further reduced by depositing a uniform and extremely thin coating of the desired metallic material over the surface of membrane 12 utilizing microscopic spraying or deposition processes, such as, but not limited to: 1) flame spraying: 2) detonation gun spraying; 3) arc plasma spraying; 4) evaporation; 5) sputter deposition: and 6) cathodic arc deposition. Utilizing a deposition process as a subsequent step after the sintering step described previously above in the preferred embodiment of the present invention a coating of approximately 0.2 microns may be deposited on the surface of membrane 12 thereby reducing the pore size by approximately eighty percent for a membrane having a maximum pore size of 0.5 $\mu$m.

In a fourth embodiment, a filter element useful in catalytic environments may be fabricated by coating membrane 12 of filter element 10, disclosed in be preferred embodiment, with gold. platinum, palladium, nickel, or silver using a deposition process discussed above.

Figure 6:
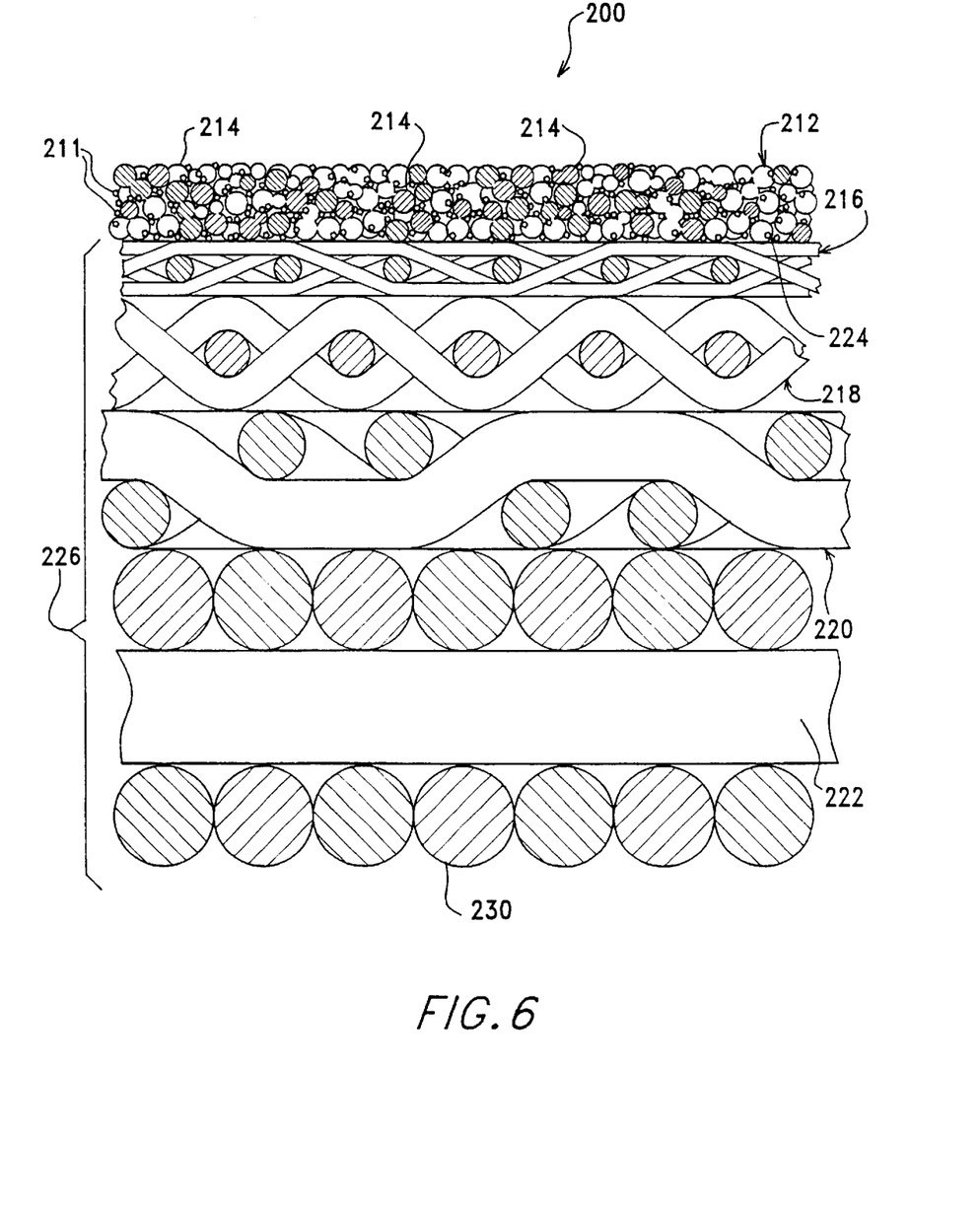
FIG. 6 is a cross-sectional view of the filtering element of the present invention wherein inert ceramic particles have been substituted for a portion of the metallic particles.
Figure 7:
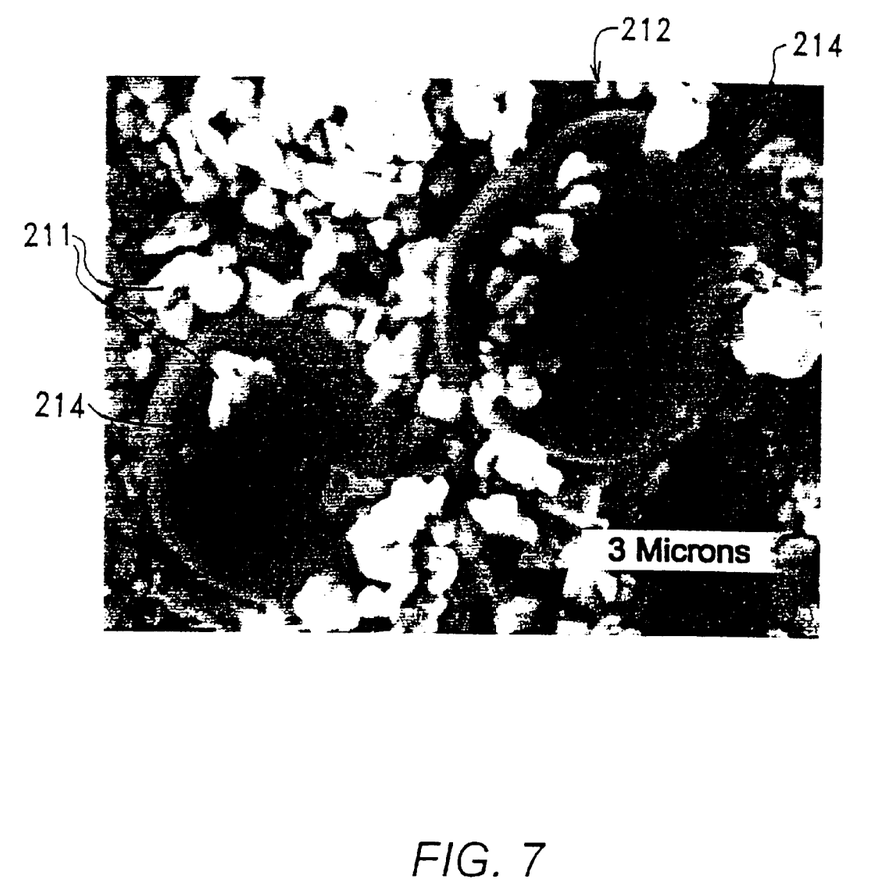
FIG. 7 is a photomicrograph (magnification 10.000 x) of the surface of a sintered membrane surface comprising, 15 weight percent alumina and 85 weight percent nickel made in accordance with the present invention.

As disclosed previously, a liquid suspension comprising 1) a solvent being either aqueous or nonaqueous; 2) a binder or polymer; 3) a plasticizer; 4) dispersants; and 5) approximately 50 to 75 percent per weight of metal particles 14 is applied to the porous metal support 26. In a fifth embodiment, the effective pore size of filter element 200, shown in FIGS. 6 and 7, is further reduced by substituting inert ceramic particles 211 for a portion of particles 214 in suspension. The size, shape and composition of the residual metallic particles 214 used remains consistent with the disclosure of the preferred embodiment. The ceramic particles 211 used may include but are not limited to ceramic oxides such as alumina ($Al_2O_3$), magnesia (MgO), titania ($TiO_2$), silica ($SiO_2$), zirconia ($ZrO_2$), yttria ($Y_2O_3$), magnesium aluminate ($MgAl_2O_3$) and nickel aluminate ($NiAl_2O_4$); ceramic nitrides such as aluminum nitride (AlN), silicon nitride ($Si_2N_3$), and silicons (SiAlON); ceramic carbides such as silicon carbide (SiC) and ceramic borides such as titanium boride ($TiB_2$). The ceramic particles 211 are formulated with the metal particles 214 at a ratio of between 0 and about 50 volume percent ceramic particles. This mixture of ceramic articles 211 and metal particles 214 is then suspended in a liquid suspension as disclosed previously.

The ceramic articles 211 used in this method of membrane 212 fabrication are not reduced to their metallic form under the processing conditions used. For example, alumina is not reduced to aluminum metal or even partially reduced under the processing conditions required to prevent the oxidation of metallic nickel or stainless steel. One additional advantage of having the ceramic particles 211 present is that the refractory ceramic particles 211 help inhibit the rotation and coalescence of the larger metallic particles 214 during sintering. This improves the uniformity of the pore size distribution of the metallic particle matrix. Furthermore specific dopants can be absorbed or adsorbed onto the surface of the ceramic particles 211 to increase filtration efficiency for the fluid(s) undergoing filtration and/or to effect specific chemical reactions over a very wide temperature range. Since little or no sintering of the ceramic particles 211 occurs during fabrication, the ceramic particles 211 are believed to be physically contained within the metallic matrix, however there may be some physical and/or chemical bonding occurring between the metallic and ceramic particles 214 and 211, respectively, ensuring membrane integrity especially since the coefficient of linear thermal expansion for the metallic and ceramic particles 214 and 211, respectively, may differ by a factor of between 2 and 10.

The invention is further illustrated by the following non-limited examples. All scientific and technical terms have the meanings as understood by one with ordinary skill in the art. The specific examples which follow illustrate the manufacture of the filtering elements of the instant invention and are not to be construed as limiting the invention in sphere or scope. The methods may be adapted to variation in order to manufacture filtering elements embraced by this invention but not specifically disclosed. Further, variations of the methods to produce the filtering elements in somewhat different fashion will be evident to one skilled in the art.

The methods and specific examples that follow are only intended for the purposes of illustration, and are not to be construed as limiting in any manner to make the filtering elements of the present invention by other methods.

EXAMPLE 1

Processing a Single Layer Membrane by Dip Coating 316L stainless steel powder with a particle size specification of minus 10 microns was formulated with the B73210 binder system purchased from FERRO Corp., Electronic Materials Division. San Marcos, Calif., and toluene in the ratio of 65 weight percent powder, 30 weight percent binder and 5 weight percent toluene. This mixture was ball milled for 6 hours in order to provide a homogenous suspension.

Substrates of modified 4-layer Purolator Poroplate laminate were cut to 1.5 inch diameter disks. These were cleaned by ultrasound in a series of acetone, methanol and distilled water. After the final ultrasound in distilled water, the disks were dried in an oven at 80–100° C. After drying, the substrate disks were prepared from the dip coating, process by masking the back (coarsest mesh side with tape to prevent the slurry from penetrating the interior of the substrate.

The dipping process was performed by immersing the substrate in the slurry suspension and withdrawing it at a rate of approximately 20 to 30 mm/min. This withdrawal rate is dependent on the rheological properties of the suspension and the desired thickness of the final membrane. Only one layer was applied to the substrate.

Following the dipping process, the deposited films were allowed to dry (solvents evaporate). This drying process was performed at room temperature for a time period of 10 to 30 minutes. After the solvents have evaporated, the deposited films are in a "green" state, comprised of 316L powder and polymer binders (and placticizers).

Binder volatization (burn-out) was performed by heating the film/substrate at a rate of 2° C./min. in an air atmosphere to 350° C. for 30 minutes. Flowing argon was used as a "sweep" gas in this procedure to help facilitate the removal of volatized organic polymers. After the 30 minutes at 350° C., a titanium "sponge" was places into the furnace to serve as an oxygen "getter." Immediately after inserting the titanium, the furnace atmosphere was evacuated, followed by a purge with argon. Once again the furnace atmosphere was evacuated, however the gas purge was performed using a mixture of 10% hydrogen/90% nitrogen. A continuous flow of this gas mix through the furnace was maintained for the duration of the sintering cycle. Sintering was achieved by heating at 10° C./min from 350 to 1000° C. with a four hour soak at 1000° C. Cooling was performed in a "power-off" mode. The hydrogen/nitrogen atmosphere was maintained until the temperature was below 300° C.

The resulting membrane/substrate (filter) structure had a mean pore diameter of 1.6 $\mu$m with a minimum of 1.5 pin and a maximum of 2.7 $\mu$m. The sintered membrane had a thickness of 75 $\mu$m with a calculated water permeability of 38.49 L/min×m$^2$×psi. Permeability data for this sample were taken using isopropyl alcohol. Water permeability was calculated using correlative data derived using samples prepared at an earlier date.

EXAMPLE 2

Processing a Two Layer, "Graded", Membrane by Dip Coating

In addition to the 10 micron powder suspension formulated in Example 1 above. 316l, stainless steel powder with a particle size specification of minus 5 microns was formulated with the B73210 binder system and toluene in the ratio of 62 weight percent powder, 32 weight percent binder and 6 weight percent toluene. This mixture was ball milled for 6 hours in order to provide a homogenous suspension.

Substrate cleaning and masking was performed as described above in Example 1

A coating/film of the 10 micron suspension was deposited on the substrate using the dipping procedure described above in Example 1. This deposited film was allowed to dry for approximately 20 minutes at room temperature. After drying all additional film was deposited on the initial layer by dipping the substrate with the dried film into the 5 micron suspension. This dipping procedure was the same as previously described.

The second layer (5 micron suspension) was allowed to dry at room temperature.

The binder volatization and sintering procedures were identical to those followed in Example 1. The sintering cycle consisted of a four hour soak at 1000° C.

The resulting membrane/substrate (filter) structure had a mean pore diameter of 1.3 $\mu$m with a minimum of 1.1 $\mu$m and a maximum of 1.3 $\mu$m. The calculated water permeability of this "graded" microstructure was 57.53 L/min×m²× psi. Permeability data for this sample were taken using isopropyl alcohol. Water permeability was calculated using correlative data derived using samples prepared at an earlier date.

EXAMPLE 3

Processing a Membrane by Tape Casting 316L stainless steel powder with a particle size specification of minus 10 microns was formulated with the B73210 binder system in the ratio of 70 weight percent powder and 30 weight percent binder. This mixture was mixed through the use of a SPEX vibratory mill for 8 minutes in order to provide a homogenous suspension.

A "cast on glass" technique was used. Prior to casting, the glass was treated with a coating of lecithin to facilitate easy removal of the deposited "tape." Tape casting was performed using a hand held doctor blade to control the slurry thickness. The blade height was set at 0.01 in. This resulted in a green tape thickness on the order of 0.003 in. (75 $\mu$m) after the elimination of volatile solvents. After drying, the green tape was removed Rom be glass casting surface and cut into one inch squares.

Substrates were modified 4-layer Purolator Poroplate laminate cut to 1.0 inch squares. The substrate cleaning procedures described in Example 1 above were followed.

Two layers of grew tape were placed on the surface of the cleaned substrate. Lamination of the layers to each other and to the substrate was performed by applying approximately 1000 psi for two minutes while maintaining a temperature of approximately 60° C. This temperature is in the region of the glass transition temperature for the thermoplastic resin in the binder system (polyvinyl butyral), thus allowing the formation of a contiguous structure. The pressure was applied to ensure adhesion of green tape to the top surface of the 4-layer substrate. Embedding of the microspheres into the weave of the top layer did not occur.

Following the lamination procedure, binder volatization and sintering was performed as described previously in Example 1, resulting in a membrane/substrate (filter) structure.

EXAMPLE 4

Processing a Membrane by Screen Printing 316L stainless steel powder with a particle size specification of minus 10 microns was formulated with ethyl cellulose and pine on to form the screen printing paste. Pine oil and ethyl cellulose were first formulated in a ratio of 9 to 1 respectively by weight. This "binder" was mixed by hand periodically over the time tame of 24 hours in order to ensure homogeneity. The 316L powder was then added to the binder in the ratio of 70% by weight. Mixing was once again performed by hand, periodically, over a 24 hour time period resulting in a "paste" suitable for printing.

Substrates were modified 4-layer Purolator Poroplate laminate out to 1.0 inch squares. The substrate cleaning procedures described above in Example 1 were followed.

A 0.75 in² pattern was printed on the substrate using the 316L paste. After printing a layer, the substrate was heated to 100°–150° C. for several minutes on a hot plate in order to volatize the solvent (pine oil) and dry the printed layer. After this drying procedure, an additional layer was printed on the surface of the first layer. This printing/drying procedure was repeated for a total of four layers on the surface of the substrate.

Binder volatization and sintering was performed as described above in Example 1. The resulting membrane/substrate (filter) structure had a sintered membrane thickness on the order of 50 to 60 $\mu$m.

EXAMPLE 5

Two Layer Hybrid Membrane on a Metallic Substrate via Spin Coating

The hybrid or composite membrane structure consisted of nickel metal and aluminum oxide. The spherical nickel was specified as sub-10 $\mu$m in diameter (type 4SP-10. Novamet. INCO Selective Surfaces. Inc., Wyckoff, N.J.); the aluminum oxide or alumina had an average particle size of 0.4 $\mu$m (type HPA-1.0 AF 99.99%, Ceralox Corp., Tucson. Ariz.). Powder for lotions were prepared with 10, 15 and 20 weight percent (18, 27 and 36 volume percent) alumina. A polyvinyl butyral based binder formulation identical to that previously described in the original patent application (B73210. FERRO Corp. Electronic Materials Division, San Marcos, Calif.) was added until it became 30 weight percent of the total formulation. The mixture was ball milled for 12 hours to provide a homogeneous suspension.

The 4-layer PUROLATOR substrate, identical to that described in the original patent application, was cut into 47 mm diameter disks. Cleaning procedures were identical to that previously described. With spin coating, no masking is required.

The spinning process was performed by applying the ball milled slurry suspension onto the substrate followed by spinning the substrate to 2800 rpm and holding for 30 seconds, then allowing normal "spin-down" to occur, the speed and time for the spinning procedure dependent upon the rheological properties of the slurry suspension. The deposited film was next allowed to air dry at room temperature for approximately 10 minutes. A second layer was next applied over the first layer using identical process parameters. The deposited films were now allowed to dry at room temperature for a minimum of 30 minutes. The deposited two-layer film on the PUROLATOR substrate is now defined as being in the "green" state and comprised of an admixture of nickel powder and alumina powder homogeneously dispersed in a polymeric binder.

The polymeric binder is next partially volatilized by heating the substrate with latent ("green" state) membrane in air at 175° C.–180° C. for 30 minutes.

Sintering was performed in a vacuum furnace. After placing the latent membrane structures in the furnace, vacuum was effected to a level of 1x 10 −5 Torr or less. The furnace was next heated to 200° C. and allowed to remain (soak) at that temperature for 30 minutes. During this soak, repeated purges with UHP argon (99.999% purity) were performed to facilitate the removal of organic binder material. The furnace temperature was then increased to 500°C., over a 30 minute period and held at 500° C. for an additional 30 minutes. During the increase to 500° C., argon purges were again performed to complete the removal of any residual organic binder material. During the soak period at 500° C., a positive pressure of Argon, 2 psi over atmospheric pressure, was maintained in the furnace. The furnace temperature was next increased to 750° C., over a 20 minute period and soaked at 750° C. for, two hours. The positive pressure of argon was maintained. Power was then turned off and the furnace was allowed to cool from 750° C. to ambient or room temperature. Time required was approximately 2 hours.

The resultant microstructures for the two-layer membranes formulated with 15 weight percent (27 volume percent) alumina are shown in the following figures.

For a two-layer membrane formulated with 20 weight percent (36 volume percent), the resulting membrane/substrate (filter) structure has a mean pore diameter of 0.18 $\mu$m with 99% of all pores having a pore diameter between 0.15 pin and 0.22 $\mu$m. The flux through this filter, using water as the fluid, was 9.5 liters/psi/square meter/minute.

Filters have been prepared varying the weight or volume percent ratio of metallic to ceramic powder and the number of layers comprising the membrane structure.

The foregoing description is considered as illustrative only of the principles of the invention. Furthermore, since numerous modifications and changes will readily occur to those skilled in the art, it is not desired to limit the invention to the exact construction and process shown as described above, Accordingly, all suitable modifications and equivalents may be resorted to falling within the scope of the invention as defined by the claims which follow.

The embodiments of the invention in which an exclusive property or privilege is claimed are defined as follows:

1. A method of making a micro/ultra-filter element comprising:
    (a) masking a uniformly porous support resulting in the pores of said support to be substantially impenetrable;
    (b) coating a solution of uniformly sized metallic particles dispersed in a fluid medium comprising a binding agent on the surface of said masked uniformly porous support, wherein said particles do not substantially penetrate the pores of said support; and
    (c) heating said coated support to a temperature sufficiently high to (i) sinter said metallic particles resulting in metallurgical adhesion between said metallic particles and between said metallic particles and said surface of said porous support thereby producing a uniformly porous membrane on the surface of said support; and (ii) volatize or burn off said mask.

2. The method of claim 1, wherein said porous support is metallic.

3. The method of claim 2, wherein said metallic porous support is comprised of a metal selected from the group consisting of titanium, iron, nickel, chromium, silver, and alloys thereof.

4. The method of claim 2, wherein said metallic porous support comprises stainless steel.

5. The method of claim 2, wherein said metallic support comprises
    (a) a first wire mesh layer having an upper surface for supporting said particles and a lower surface, wherein said first layer supports said particles;
    (b) a second wire mesh layer bonded to the lower surface of said first layer, wherein said second layer protects said first layer from possible deformation under high pressure;
    (c) a third wire mesh layer bonded to said second layer, wherein said third layer lends support to said metallic support; and
    (d) a fourth wire mesh layer bonded to said third layer, wherein said fourth layer lends support to said metallic support, and said first layer has a finer mesh size than said second, third and fourth layers.

6. The method of claim 5, wherein said first layer has an approximate weave count of 325×2000.

7. The method of claim 1, wherein said metallic particles are comprised of a metal selected from the group consisting of titanium, iron, nickel, chromium, silver and alloys thereof.

8. The method of claim 1, wherein said metallic particles comprise stainless steel.

9. The method of claim 1, wherein said metallic particles have a uniform particle size ranging from about 1 $\mu$m to 10 $\mu$m.

10. The method of claim 1, wherein said particles consist essentially of the same material as said support.

11. The method of claim 1, wherein said solution of particles comprises said particles in the range of 50 to 75 weight percent and a binder system i the range of 25–50 weight percent.

12. A method of claim 11, wherein said binder system comprises a solvent in the range of 5 to 10 weight percent, a binder, a plasticizer and a dispersant.

13. The method of claim 12, wherein said binder is polyvinyl butyral.

14. The method of claim 12, wherein said solvent is toluene.

15. The method of claim 1, further comprising the step of applying a second mixture of particles dispersed in said binder system to said membrane surface.

16. The method of claim 15, wherein said particles in said second mixture have a smaller diameter than said particles in said first mixture.

17. The method of claim 1, wherein said heating step takes place in the presence of an oxygen gettering agent.

18. The method of claim 1, wherein said porous, membrane has an average pore size in the range of about 0.005 to 10 micrometers.

19. The method of claim 1, further comprising the step of applying a film coating over said membrane surface.

20. The method of claim 19, wherein said film is applied using a deposition process.

21. The method of claim 19, wherein said film has a thickness of about 0.2 µm.

22. The method of claim 1, wherein said filter element is planar.

23. The method of claim 1, wherein said porous support is formed into a desired geometric shape prior to the coating step.

24. A method of making a micro/ultra-filter element comprising:
(a) masking a uniformly porous support resulting in, the pores of said support to be substantially impenetrable;
(b) depositing on the metallic, multi-layered porous support a plurality of uniformly sized metallic particles that are spherical in shape, wherein said particles do not substantially penetrate the pores of said support;
(c) sintering said metallic particles and said masked support to the extent that said particles and said support adhere forming a contiguous membrane on the surface of said support, said membrane having consistent uniform pore size and pore size distribution; and
(d) removing said mask from said masked metallic, multi-layered porous support.

25. A method of making a micro/ultra-filter element comprising:
(a) coating a solution of uniformly sized metallic particles dispersed in a fluid medium comprising a binding agent on the surface of said masked uniformly porous support, wherein said particles comprise metallic particles and ceramic particles at a ratio between greater than 0 volume percent and less than or equal to 50 volume percent ceramic particles; and
(b) heating said coated support to a temperature sufficiently high to sinter said metallic particles but below the sintering temperature of said ceramic particles, resulting in metallurgical adhesion between said metallic particles and between said metallic particles and said surface of said porous support, thereby producing a uniformly porous membrane on the surface of said porous support.

26. The method of claim 25, wherein said metallic particles are comprised of a metal selected An the group consisting of titanium, iron, nickel, chromium, silver and alloys thereof.

27. The method of claim 25, wherein said ceramic particles are comprised of an oxide.

28. The method of claim 27, wherein said oxide is selected from the group consisting of alumina ($Al_2O_4$), magnesia (MgO), titania ($TiO_2$), silica ($SiO_2$), zirconia ($ZrO_2$), yttria ($Y_2O_3$), magnesium aluminate ($MgAl_2O_4$), and nickel aluminate ($NiAl_2O_4$).

29. The method of claim 25, wherein said ceramic particles are comprised of a nitride.

30. The method of claim 29, wherein said nitride is selected from the group consisting of aluminum nitride (AlN), silicon nitride ($Si_2N_3$), and sialons (SiAlON).

31. The method of claim 25, wherein said ceramic particles are comprised of a carbide.

32. The method of claim 31, wherein said carbide is selected from the group consisting of silicon carbide.

33. The method of claim 25, wherein said ceramic particles are comprised of a boride.

34. The method of claim 33, wherein said boride is selected from the group consisting of titanium boride ($TiB_2$).

35. A method of making a micro/ultra filter element comprising:
(a) depositing on the surface of a metallic, multi-level porous support a plurality of uniformly sized particles that are spherical in shape, wherein said particles comprise metallic particles and ceramic particles at a ratio between greater than 0 volume percent and less than or equal to 50 volume percent ceramic particles; and
(b) sintering said metallic particles and said support at a sufficiently high temperature such that said particles and said support adhere but below the sintering temperature of the ceramic particles, thereby forming a contiguous membrane on the surface of said support, wherein said membrane has consistent uniform pore size and pore size distribution.

36. A filter element comprising
(a) a top porous membrane comprising ceramic particles and contiguous metallic particles, wherein said ceramic particles are present at a ratio of between greater than 0 volume percent and less than or equal to 50 volume percent, and wherein said metallic particles are sintered and form a metallic matrix and said ceramic particles are contained within said metallic matrix;
(b) a first layer Ar supporting said membrane, said first layer comprised of a first wire mesh for supporting said membrane;
(c) a second layer comprising a second wire mesh bonded to said first layer for protecting said first layer from deformation;
(d) a third layer comprising a third wire mesh bonded to said second layer for stabilizing the filter element; and
(e) a fourth layer comprising a fourth wire mesh bonded to said all layer for providing additional rigidity to the filter element,
wherein said metallic particles are further sintered to said first layer.

* * * * *